Dec. 15, 1931.  A. P. BUCCIALI  1,837,106

MOTOR VEHICLE

Filed Sept. 25, 1928  4 Sheets-Sheet 1

INVENTOR
Albert P. Bucciali
BY
*Munn&Co.*
ATTORNEYS

Dec. 15, 1931.  A. P. BUCCIALI  1,837,106
MOTOR VEHICLE
Filed Sept. 25, 1928   4 Sheets-Sheet 2
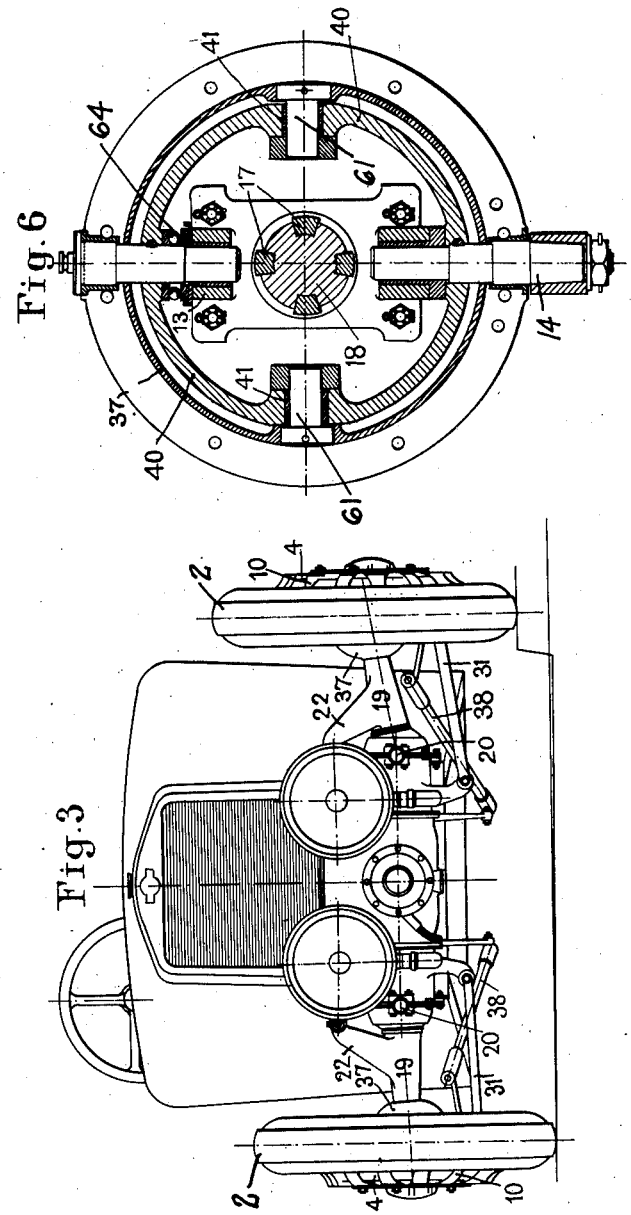
INVENTOR
Albert P. Bucciali
BY
ATTORNEYS Dec. 15, 1931.  A. P. BUCCIALI  1,837,106
MOTOR VEHICLE
Filed Sept. 25, 1928  4 Sheets-Sheet 3
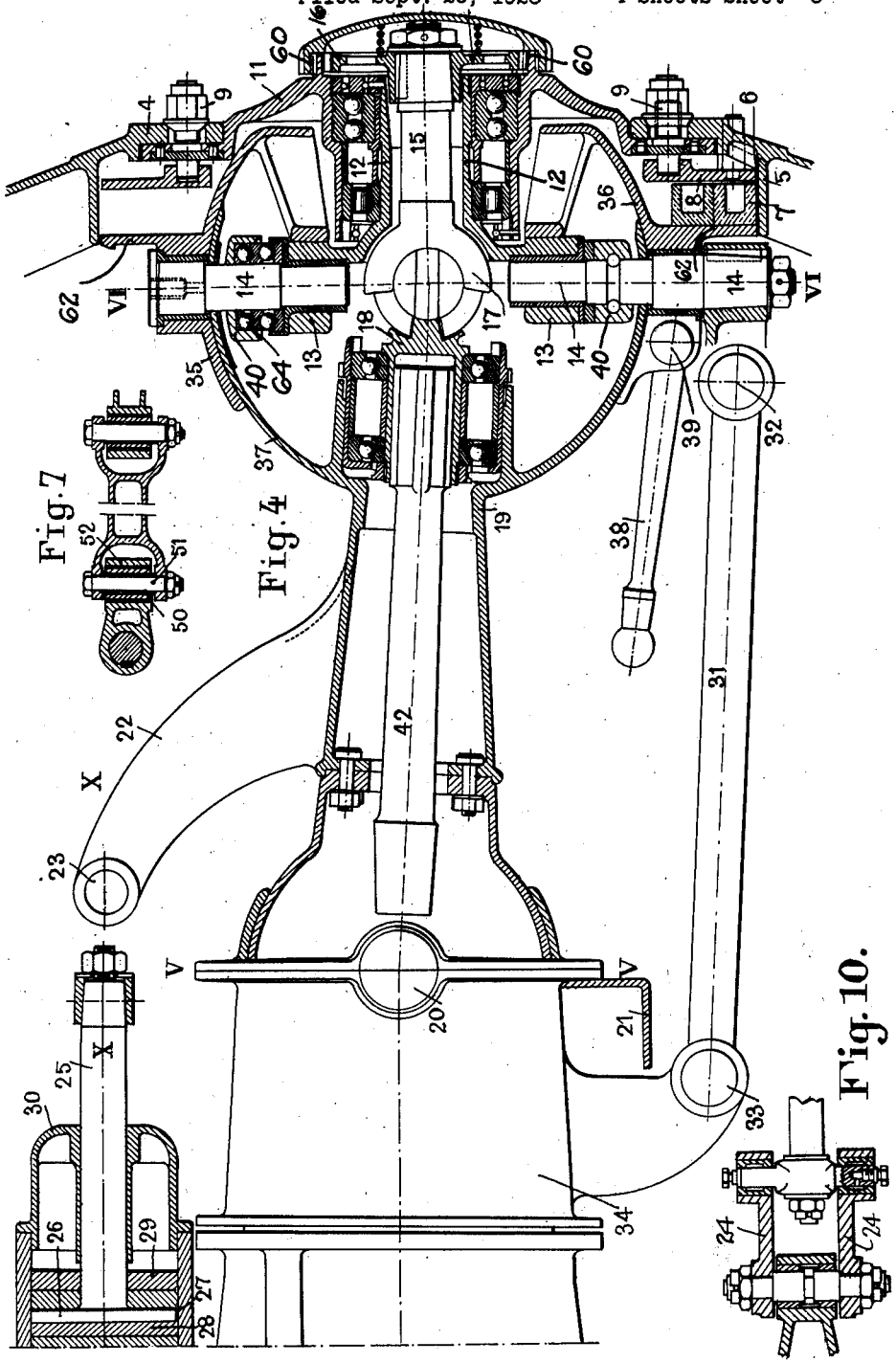
INVENTOR
Albert P. Bucciali
BY
ATTORNEYS

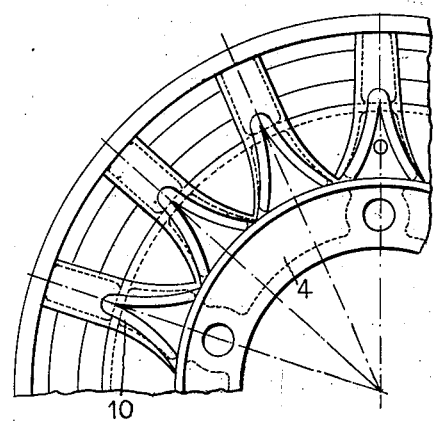
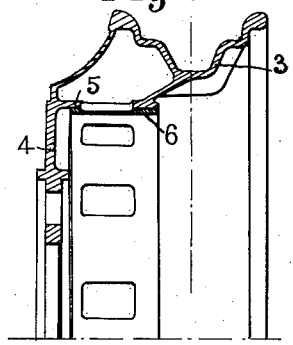
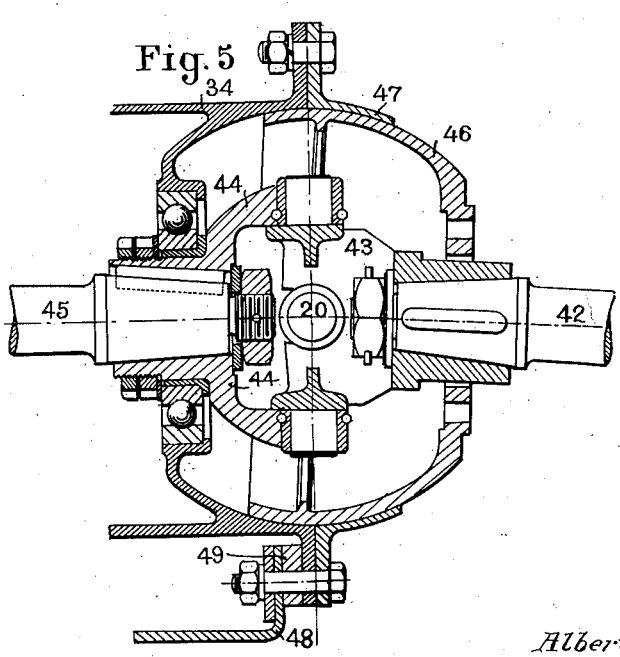

Patented Dec. 15, 1931

1,837,106

UNITED STATES PATENT OFFICE

ALBERT PAUL BUCCIALI, OF PARIS, FRANCE

MOTOR VEHICLE

Application filed September 25, 1928, Serial No. 308,160, and in France October 4, 1927.

The present invention relates to improvements in motor vehicles.

It chiefly comprises a spring suspension device which is independent of each wheel and is provided with automatic damping means affording the elasticity of this suspension while preventing all rebounds. The said invention further relates to a particular disposition of the wheels on their axles, as well as to the disposition of the brakes and also of the front wheels, for the proper steering. The invention also relates to a particular form of the wheels for the obtainment of the rigidity and strength desired for the particular method of suspension in use, by affording the disposition, in the interior of the wheels, of the braking elements as well as their control preferably by electric means. Arrangements as also made for the ventilation of the wheels whereby all heating due to the braking action will be obviated.

Figure 1:
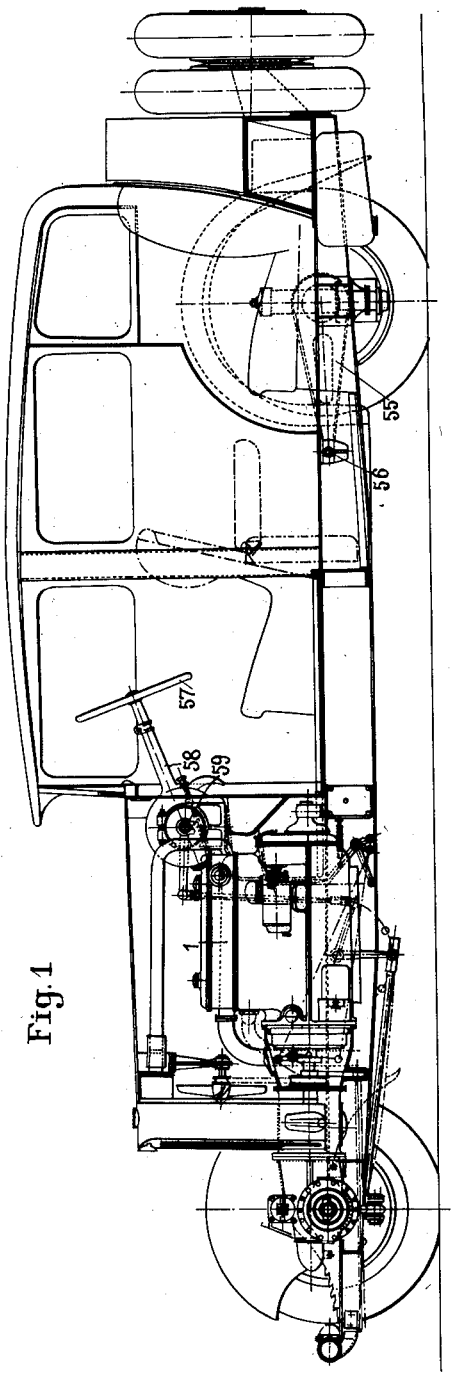
Figure 2:
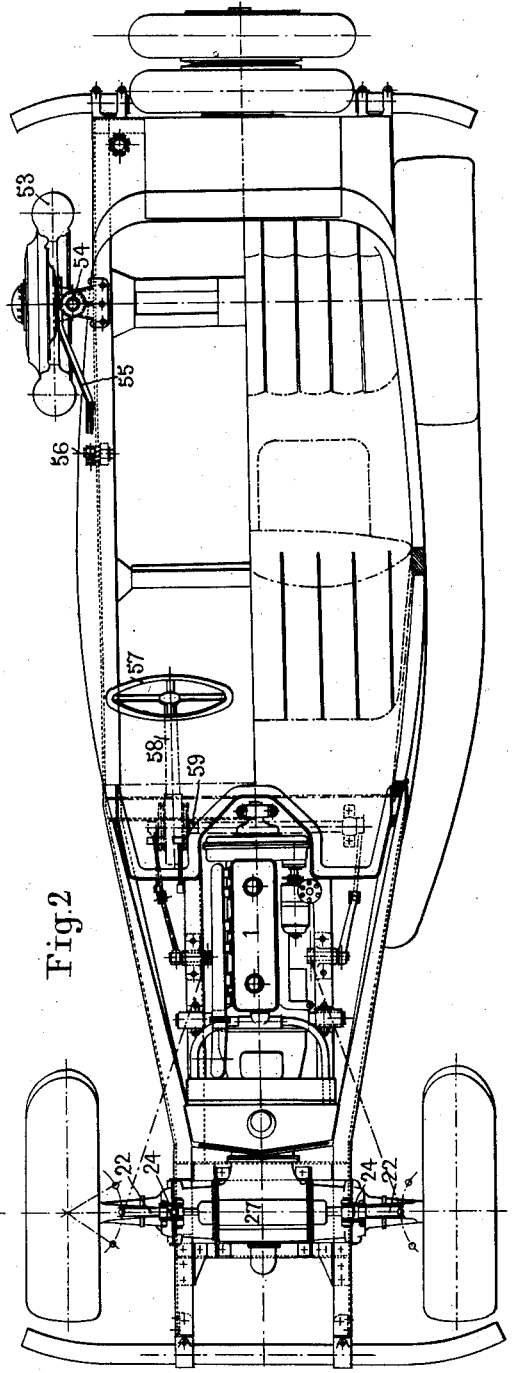

In the appended drawings which show by way of example an embodiment of the invention:

Figs. 1 and 2 are respectively an elevational view with partial section and a plan view with partial section, of a motor vehicle comprising the improvements according to the invention. Fig. 3 is a front view of the vehicle. Fig. 4 is a vertical cross section showing the arrangement of the wheel and of the corresponding suspension. Fig. 5 is a detail view of the Cardan pivoting device of the shaft actuating each of the driving wheels, on the line V—V of Fig. 4. Fig. 6 is a vertical section on the line VI—VI of Fig. 4. Fig. 7 is a sectional detail of the arrangement of a connecting rod used for the suspension. Figs. 8 and 9 are respectively a partial elevation and a partial section of a wheel. Fig. 10 is a detail of a thrust shackle of the suspension device, on the line X—X of Fig. 4.

The present form of construction of the vehicle comprises the front driving and steering wheels 2, these being driven from the engine 1 by suitable power transmission means, and preferably an automatic change speed device.

Each of the said wheels, as also (preferably) the rear wheels, comprises a wheel rim 3 of suitable construction which is so disposed with reference to the web 4 of the wheel that the axis of the tread of the pneumatic or other tyre of said rim will pass through the pivoting centre of the wheel; said wheel rim is cast in one with the rim of the brake drum 5 which is lined with a steel ring 6 coacting with the expanding brake shoes. In this construction, the brake is under electric control and comprises for each wheel (Fig. 4) a pole piece 7 coacting with a brake disc 8 secured to the wheel brake and rotatable therewith.

The said wheel and brake are connected together by the driving pins 9 provided with external nuts, in such manner that the device consisting of the brake and its control may be inspected by simply removing the wheel after unscrewing the nuts 9.

Each wheel preferably comprises the pressed spokes 10 connecting the wheel rim 3 with the web 4, and the brake drum 5 is suitably cut out so as to assure the ventilation of the device and to obviate all heating due to the braking operation.

The driving pins 9 connect the web 4 of the wheel with the central part 11 of the hub which is mounted by means of suitable ball bearings upon a hollow journal or sleeve 12 ending at the bottom in a fork 13 in which are pivoted the vertical axles 14 of a spherical Cardan device more familiarly known as a universal joint, whose axis is situated in the vertical plane of pivotation of the front axle as well as in the vertical plane of the tread of the wheel.

The hollow journal or sleeve 12 is traversed by the shaft spindle 15 driving the vehicle wheel, to the outer end of which shaft is keyed a spur gear wheel 16 interlocked with a ring gear 60 mounted on the hub 11 to compose a connection for the driving of the wheel. The ring and spur gears are of substantially the same pitch diameters so as to fit together snugly and accurately, thereby avoiding appreciable backlash. On the lower end of the shaft 15 is mounted a Cardan fork 17, of the spherical Cardan type, coacting with a sliding fork 18 mounted in a tubular case or arm 19 pivoted on an axle 20 which is mounted for instance on a crosspiece 21 of the vehicle frame, situated either inside or outside the longitudinal beam.

The pivoted casing 19 carries for instance at the top a strong arm 22 whose end is connected by a joint 23—preferably by the interposition of a pivoted shackle such as 24 shown in Figure 10—with a push piece 25 terminated for instance by a piston 26 slidable in a cylinder 27 containing a suitable elastic element, consisting preferably of sets of discs in alternate disposition and formed of an elastic substance such as natural or artificial india rubber or the like and a suitable metal such as steel, as shown at 28. Like discs may be disposed at 29 on the face of the piston adjacent the push piece 25 the number of these latter discs being however much less, or forming a more elastic device. The cylinder 27 is closed by a cap 30 whose position is adjustable, by which provision for adjustment the initial elasticity of the spring suspension system may be determined with all desired accuracy.

The cylinder 27 forming the outer casing of the suspension device may be common to the two wheels situated in the respective sides of the vehicle frame, the pistons 26 coacting with said wheels being in contact at one end with a common set of india rubber or metal discs, (or washers) 28 and at the other end with a similar arrangement 29.

This disposition of the discs or washers of natural or artificial india rubber or like substance, in combination with the interposed metal (or other) discs, affords a more approved damping of the shocks or jolting, due to the hysteresis of the india rubber, which absorbs the shocks and imparts them only in a progressive manner, and not instantly, on the contrary to what takes place with the usual metallic suspension springs.

To assure the maintenance of the wheel in the vertical position, the apparatus comprises a link 31 which is pivoted respectively at 32 and 33 to one of the vertical shafts of the Cardan device and to a point of the differential casing 34; said link forms with the casing 19, pivoted at 20, a parallelogram device by which each wheel is maintained in the proper position. Attention is directed to Figure 4 in which it is observed that the pivotal points 20, 17, 32 and 33 define what might be termed the corners of the parallelogram. The shaft 42 and its tubular case or arm 19 comprise one longitudinal side of the parallelogram, it being noted that these elements are situated on a common major axis. The link 31 comprises the other longitudinal side of the parallelogram.

At this point it is desired to emphasize the advantages of the parallelogrammic arrangement of the particular part of the wheel mounting under discussion. It is a condition peculiar to the front wheels of a motor car that a gyroscopic action will be set up during rotation, this action becoming more pronounced as the rate of rotation is increased. The common and most familiar effect of this gyroscopic action is a wobbling or shimmying of the front wheels. It is by virtue of the holding effect of the link 31 and the mutual stabilization that occurs along the lines of the foregoing parallelogram that the effect of this gyroscopic action is totally nullified and so compensated for that no wobbling or shimmying whatever occurs in the front wheels regardless of how fast the motor car is driven.

The facility that the parallelogrammic suspension affords is particularly significant in the suspension of positively driven front wheels. Such wheels are obviously directly animated with the driving power and if these wheels were permitted to be subject to the common fault of wobbling or shimmying this fault would be greatly accentuated by virtue of being under stress of the applied power. Therefore the parallelogrammic suspension is called upon not only to always maintain each front wheel in absolutely true perpendicularity but to do so under the stress of the applied power as well as under uneven road conditions as when one wheel will ride higher than the other.

Another feature that is regarded as of great importance inasmuch as to it may be laid the secret of a successful front wheel drive, is what may well be termed a three-way articulation of the immediate wheel bearing. This feature is best understood by a brief comparison of the suspension in Figure 4 with known types of front wheel suspensions of motor cars.

Swinging of each front wheel occurs in the horizontal plane, the axles 14 being the vertical pivot. Known types of motor cars have wheels that are similarly pivoted so as to swing in a horizontal plane for steering. The shaft spindle 15, like other known wheel spindles, constitutes the horizontal axis upon which the wheel revolves, but it is at the two axes mentioned that the resemblance of known types of front wheel suspensions with the present improvement ends.

The third and most important element of the articulation resides in that manner of connection by which the wheel and the aforesaid vertical axles and horizontal spindle can rise and fall in respect to the motor car without subjecting the chassis of the latter to any stress or strain whatever due to the said rising and falling, and at the same time maintain a true and necessary perpendicularity of the wheel.

It will be observed at once that the foregoing manner of connection is synonymous with the parallelogrammic arrangement of the wheel mounting or suspension because by reason of it the entire wheel and its driving assemblage can ride up and down with the utmost freedom and do so without transmitting the shocks to the chassis. The other known types do not possess this component of bodily vertical movement of the wheel and its driving assemblage, hence transmit the shocks and impacts directly to the chassis, in many instances necessitating both elaborate and expensive shock-absorbing apparatus. The pivoting axis of the wheel consists of the vertical Cardan shaft 14 connected with two pivoted half-cases 35—36 forming a ball-and-socket joint case adjacent the steering control; said casing is slidable on the round head 37 of the pivoted slidable casing 19 whereby the lubrication of the power transmission device and of the steering pivot joint will be assured. The half cases carry an outstanding flange 62 which provides a plate for closing one side of the brake drum previously alluded to.

The link 38 for steering the wheel is pivoted at 39 to the boss of the pivoting shaft of the wheel.

The round head 37 of the pivoting case 19 and the ring of the Cardan ring 40 (Fig. 6) have suitable bearing portions at their junction, in which the shafts 61 (Fig. 6) connecting these parts are held by nuts or by suitable screwing, so that the parts can be more readily mounted and the pieces can be more accurately trimmed and will possess a greater strength. This arrangement also allows of distributing the resistance according to needs, and of obtaining a more easy operation of the parts, while the supports for the steering gear and the supports of the pivoted levers are more readily accessible. Fig. 6 shows the arrangement of the vertical ring of the device 40, and of the horizontal ring 41. A thrust bearing 64 situated between one of the forks 13 and the ring 40 carries much of the weight transferred to the adjacent wheel.

At its inner end (Figs. 4 and 5), the shaft 42 of the slidable fork 18 of the Cardan device driving the wheels is connected by a Cardan driving device 43—44 with the shaft 45 of the differential. The shaft 42 is suitably secured to a ball joint 46 pivoted in an outer fitting 47 mounted on the fitting or case 34 of the driving Cardan device, and this arrangement protects the parts against dust. This casing is secured to the front longitudinal beam 48 of the vehicle frame, a suitable crosspiece 49 being provided to strengthen the whole.

The various connecting rods or links preferably comprise noiseless joints, which are chiefly shown in Fig. 7; these consisting of an india rubber sleeve 50 which is vulcanized upon the axle 51 and also upon the eye or aperture 52, so as to prevent all play, so that the wear will be much reduced.

Each of the rear wheels 53 (Figs. 1 and 2) is mounted as above stated upon a shock absorber 54 comprising a cylinder containing washers or discs alternately of india rubber and of metal such as steel or the like. The wheel is connected with a reaction link 55 secured for instance to the cheek of the wheel together with the shock absorber 54, the said link being pivoted at 56 or secured to the vehicle frame in any suitable manner.

The steering wheel 57 is slidable in its shaft 58, and the said shaft is mounted so as to pivot about a horizontal shaft 59 so that the driver may adjust the said wheel 57 as desired.

What I claim is:

1. A driving and steering mounting for front wheels comprising a tubular case with a hollow spherical terminal composed of a head connected with the case and half cases movably applied to the head, a sleeve having a fork with which said half cases are connected, axles by which the sleeve is connected at the fork with said terminal and by which the half cases are connected with the head for said movement, a ring having bearing connections with the head and embracing the axles for stabilization, a wheel having a hub journaled on the sleeve, means connected with one of the half cases for turning said half cases and the sleeve upon said axles thus to steer the wheel, and a shaft extending through the sleeve into driving connection with the hub, said shaft having a universal joint centrally alined with the axles to accommodate said steering.

2. A wheel mounting comprising a hollow spherical terminal composed of a head and a pair of half cases, a sleeve situated in the terminal and having a fork, a pair of axles vertically alined with the center of the terminal serving to connect the forks with said terminal and provide bearings upon which the half cases revolve in respect to the head, a wheel having a hub journaled on the sleeve, a ring having bearing on the head and embracing the axles for stabilizing the same, and a thrust bearing situated between one of the forks and an adjoining part of the ring.

3. A wheel mounting comprising a hollow spherical terminal composed of a head and a pair of half cases movably applied to the head, a sleeve having forks with which the half cases are connected, means connecting the forks with the spherical terminal so that the half cases and sleeve may turn relatively to the head, a wheel having a hub journaled on the sleeve and having a web formed to provide part of a brake drum, and a flange outstanding from the half cases providing a plate for closing one side of the brake drum and providing a mounting for an element of a brake.

4. A wheel mounting comprising a differential casing adapted to be mounted on the chassis of a vehicle, a tubular case horizontally pivoted upon said casing and having a spherical terminal composed of a head connected with the case and a pair of half cases movably applied to the head, a sleeve, means providing a vertical axial connection of the sleeve with said terminal upon which means the half cases are movable relatively to the head, a wheel journaled upon the sleeve, a horizontally acting shock absorber carried by the differential casing having connection with the tubular case for buffing shocks in either direction upon swinging of the tubular case upon its pivot, and a steering link for steering the wheel being pivoted horizontally to one of said half cases to accomplish the necessary turning yet yield to the vertical motions of the tubular case.

5. A wheel mounting comprising a tubular case horizontally pivoted in respect to the chassis of the vehicle, a jointed terminal for the case including a sleeve, a wheel having a hub journaled on the sleeve, a drive shaft for the wheel having universal joints centered upon the horizontal pivot and upon the joint of said terminal, and means tending to prevent the case from swinging down on its horizontal pivot when the chassis is jacked up as well as buffing movements of the case in the other direction upon its pivot, said means comprising a cylinder carried by the chassis, a piston operable in the cylinder and having elastic elements on each side, a piston rod, an arm on the tubular case, and a shackle connecting the arm with the piston rod compensating for movements of the case in either direction.

6. In a machine of the character described wherein the steering wheels are free to move vertically independently of each other and the other wheels of the machine, a driving shaft, driving mechanism and a universal joint connecting said mechanism to said shaft, a casing for the driving mechanism and shaft, jointed means by which the wheel is connected with the shaft, and means by which the wheel is mounted on the casing, establishing a two-way articulation between the wheel and casing enabling horizontal turning of the wheel and bodily vertical oscillation of the wheel and drive shaft in respect to the universal joint.

7. A front wheel driving and steering mounting comprising a differential casing, a driver contained thereby terminating in a Cardan joint, a tubular case pivoted upon said casing and terminating in a spherical head, a shaft joined in the case connected at one end with said Cardan joint and carrying a Cardan joint within the head, a wheel having a hub, a drive spindle connected with the hub at one end and with the last Cardan joint at the other end, and means for revolubly supporting the hub on the head, said means including a sleeve on which the hub is journaled, and a Cardan ring carrying the sleeve and having pivots at right angles axially coinciding with the axial center of said last Cardan joint.

8. A front wheel assemblage for motor vehicles comprising a fixed differential casing with a drive component terminating at a Cardan joint at each end, a pair of front wheels of which each has a hub, tubular cases extending out toward the hubs, means by which the hubs are supported on said cases, means pivotally connecting the cases with the differential casing enabling independent movements of the wheels in one direction, two-way-motion means embodied in said mounting means enabling tilting of the wheels in right angular directions, and means to revolve the hubs including shafts housed by the cases, extending from the Cardan joints of said drive components and in turn connected with drive spindles coupled with the hubs and having Cardan joints axially centered with said two-way-motion means.

9. A wheel mounting comprising a case, an arm solid with said case, a wheel journaled upon the case, a pivot supporting the case for vertical swinging motions, shock absorbing means disposed substantially horizontally and including a piston rod, and means connecting the arm with the piston rod, converting the swinging motions of the case into rectilinear movements of said rod.

10. A parallelogrammic wheel suspension comprising a driving shaft forming one side of the parallelogram, a universal joint connecting said shaft to a driving mechanism, a universal joint connecting said shaft with a wheel spindle, link means coextensive with said shaft and forming the other side of the parallelogram, and means pivotally mounting the ends of said link means respectively adjacent to the driving mechanism and said spindle, said pivotal mountings and universal joints being in line and completing the ends of the parallelogram.

11. A parallelogrammic wheel suspension comprising a driving shaft forming one side of the parallelogram, a universal joint connecting said shaft to a driving mechanism, a universal joint connecting said shaft with a wheel spindle, link means coextensive with said shaft and forming the other side of the parallelogram, means pivotally mounting the ends of said link means respectively adjacent to the driving mechanism and said spindle, said pivotal mountings and universal joints being in line and completing the ends of the parallelogram, and shock absorbing means combined with said suspension and acting in a substantially horizontal direction to buff the motions of said suspension in the vertical plane.

In testimony whereof I have hereunto set my hand at Paris this 12th day of September, 1928.

ALBERT PAUL BUCCIALI.